United States Patent [19]
Duikers

[11] 3,741,705
[45] June 26, 1973

[54] TRIMMING APPARATUS FOR ROTARY EXTENSION BLOW-MOLDING MACHINES

[75] Inventor: Marcel Duikers, La Hulpe, Belgium

[73] Assignee: Solvay & Cie., Brussels, Belgium

[22] Filed: Mar. 9, 1971

[21] Appl. No.: 122,417

[30] Foreign Application Priority Data
Mar. 12, 1970 Belgium .................................. 86300

[52] U.S. Cl. ................. 425/311, 425/326 B, 83/337
[51] Int. Cl. ............................................ B29c 17/10
[58] Field of Search ................... 425/310, 311, 313, 425/326 B, 342, 405; 264/151, 163; 18/5 BQ, 5 BS; 83/337

[56] References Cited
UNITED STATES PATENTS

| | | | |
|---|---|---|---|
| 2,579,399 | 12/1951 | Ruekberg | 425/342 |
| 2,750,625 | 6/1956 | Colombo | 425/326 B X |
| 2,975,471 | 3/1961 | Sherman | 425/313 |
| 3,111,711 | 11/1963 | Colombo | 425/326 B |
| 3,163,690 | 12/1964 | Scott | 425/151 X |
| 3,287,482 | 11/1966 | Wnek et al. | 425/311 X |
| 3,430,290 | 3/1969 | Kinslow, Jr. | 425/325 X |

Primary Examiner—R. Spencer Annear
Attorney—Spencer & Kaye

[57] ABSTRACT

Apparatus for trimming unwanted material from between two sets of molds of a rotary machine for carrying out a process of extrusion blow-molding of hollow articles from a synthetic resin material has a double-edge blade, each cutting edge of which is arranged adjacent the bottom of a respective mold and oriented parallel to the closing plane thereof when the blade is in an inoperative position. The blade is mounted for pivotal movement about an axis parallel to the edges. Means are provided for pivoting the blade first in one rotational direction and then in the opposite rotation direction through an angle in each instance sufficient for shearing through unwanted material extending from the mold by coaction with the respective mold bottom.

6 Claims, 4 Drawing Figures

TRIMMING APPARATUS FOR ROTARY EXTENSION BLOW-MOLDING MACHINES

BACKGROUND OF THE INVENTION

This invention relates to a trimming device permitting the removal of unwanted material left between two successive molds of a rotary machine intended for the extrusion blow-molding of hollow bodies from a synthetic resin material, and consequently permitting the separation of the hollow articles molded in these molds.

Rotary machines for molding hollow bodies by extrusion blow-molding are known, in which a continuously extruded parison is deposited tangentially in closely-spaced half-molds mounted on the arms of a rotating support, each half-mold having a second and complementary half-mold which is brought down on to the first half-mold after the parison has been deposited therein so as to form a complete mold. The complete molds are provided with means such as a hollow needle which permits the introduction of an expansion fluid into the portion of parison enclosed in the respective complete mold and sealed at its ends.

This type of rotary machine permits the continuous and rapid production of hollow bodies connected together by portions of parison; specifically by the unwanted portions of parison left between successive molds. The strings of hollow bodies obtained in this manner give rise to certain handling and finishing problems, since the hollow bodies must still be separated and the unwanted material trimmed off. In this type of rotary molding machine trimming devices are commonly arranged between each successive pair of molds such as shown in the U.S. Pat. No. 3,430,290 by Kinslow.

A proposed method and apparatus for trimming off unwanted material from hollow bodies has been set out in U.S. Pat. application Ser. No. 112,726 filed Feb. 4, 1971 by Del Piero et al. and based on Belgian Pat. No. 745,525. This application is commonly owned with the present application.

SUMMARY OF THE INVENTION

It is an object of the present invention to provide a trimming device which permits the removal of the unwanted material left between the successive molds of the above-mentioned type of machine during operation thereof, and, consequently, the separation of hollow bodies or articles during molding, and which in addition can permit the complete trimming of the ends of the hollow molded articles.

According to the present invention, the above and other objects are achieved by the provision of a trimming device which permits the removal of unwanted material left between two successive molds of a rotary machine for the extrusion blow-molding of hollow bodies of synthetic resin material, this device has a double-edged blade pivotally mounted between the molds, each of the cutting edges of the blade being adjacent to the bottom of the nearer mold when the blade is in an inoperative position and oriented parallel to the closing planes of the molds. The device also has blade-pivoting means permitting the pivoting of the blade in each sense of rotation in turn through an angle sufficient for the shearing through of the unwanted material against each mold bottom.

The invention also includes extrusion blow-molding machines for molding hollow bodies of synthetic resin material and equipped with one or more trimming devices according to the present invention.

The means used to effect the pivoting of the blade in each sense of rotation in turn may be any suitable, known arrangement. Thus, it would be possible, for example, to provide a double-acting piston connected to a crank fixed to the end of a pivot-pin carrying the blade. It is preferable, however, to use a fixed cam of suitable profile which acts at the desired moment on the blade-pivoting means, for example, on the end of an arm mounted on and extending perpendicularly from a pivot pin carrying the blade.

It is to be understood that the device according to the present invention is intended to be placed between successive molds of a suitable molding machine.

It will also be appreciated that the blade should preferably be as narrow as possible, so that the distance between successive molds — and consequently the length of the unwanted material to be removed — can be kept as short as possible.

The operation of the device according to the present invention is as follows. After at least one of the molds adjacent to the blade — specifically, the one preceding it — has been closed, the blade pivots first in one sense of rotation, or rotational direction and then in the opposite rotational direction and, thus, shears off the unwanted portion of parison against each mold bottom. The unwanted portion of parison then may be removed, for example, by gravity at a later stage in the rotation of the molds.

The present invention will be explained in more detail with reference to the accompanying drawings, which relate to a rotary machine for fabricating hollow articles by extrusion blow-molding. This machine has double-cavity molds. It will be understood, however, that this description, which is given purely by way of illustration, does not in any way limit the scope of the present invention, and that various modifications may be made in the device described below.

DESCRIPTION OF THE PREFERRED EMBODIMENTS

Figure 4:
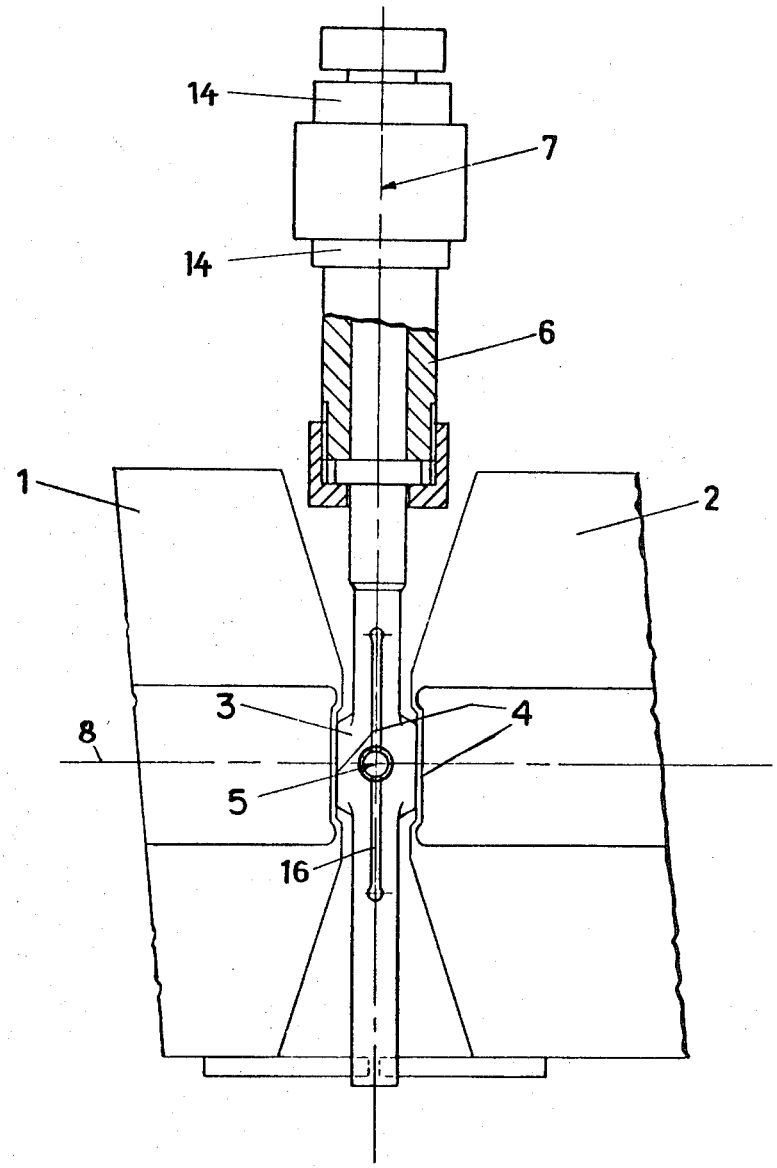
FIG. 4 is a schematic, top plan view, partly in cross section, showing a trimming device according to the present invention.

As shown in the drawings, the trimming device comprises a thin pivoting blade 3 constructed of a suitable material, such as steel, and arranged between two successive molds 1 and 2 of the suitable, known molding machine. An example of such a machine may be found in U.S. Pat. application Ser. No. 776,968, filed Nov. 19, 1968 and commonly owned with this application. Blade 3, which is mounted on a support 6 (FIG. 4), defines a slot 16 along an axis 7 intermediate its two cutting edges and parallel thereto, and receives in this slot a known tapering adjustment screw 5 which permits the width of the blade 3 to be varied in a known manner. In the "rest" or inoperative position of blade 3, each longitudinal cutting edge 4 (FIG. 4) of the blade 3 bears against the bottom 11 (FIGS. 1 and 2) of a respective mold. These longitudinal cutting edges 4 are also arranged to be parallel to the closing planes 8 (FIG. 1) of the molds, and situated slightly below the respective planes 8. The blade support 6, and consequently the blade 3 itself, are pivotable about their longitudinal axis 7 (FIG. 4) so as to be rotatable as shown by arrows 10, 12 (FIG. 1) by the movement of opposed cranks 14 and 17 attached in a known manner to the extremity of the blade support 6. The cranks 14 and 17 are each equipped at their free end with a cam follower. The trimming device is completed with two fixed cams 18 and 19 adequately mounted on the frame of the machine. Cam 18 of appropriate profile is situated on the path of crank's 14 cam follower and similarly cam 19 is situated on the path of crank's 17 cam follower.

The operation of the trimming device according to the present invention will now be described. The molds 1 and 2, which rotate in the direction indicated by the arrow 15 of FIG. 1, are closed up so that a parison 9 is confined within each mold and sealed at its ends.

This parison may be obtained from any usual plastic material such as for example, polyvinyle chloride or polyolefins.

Figure 1:
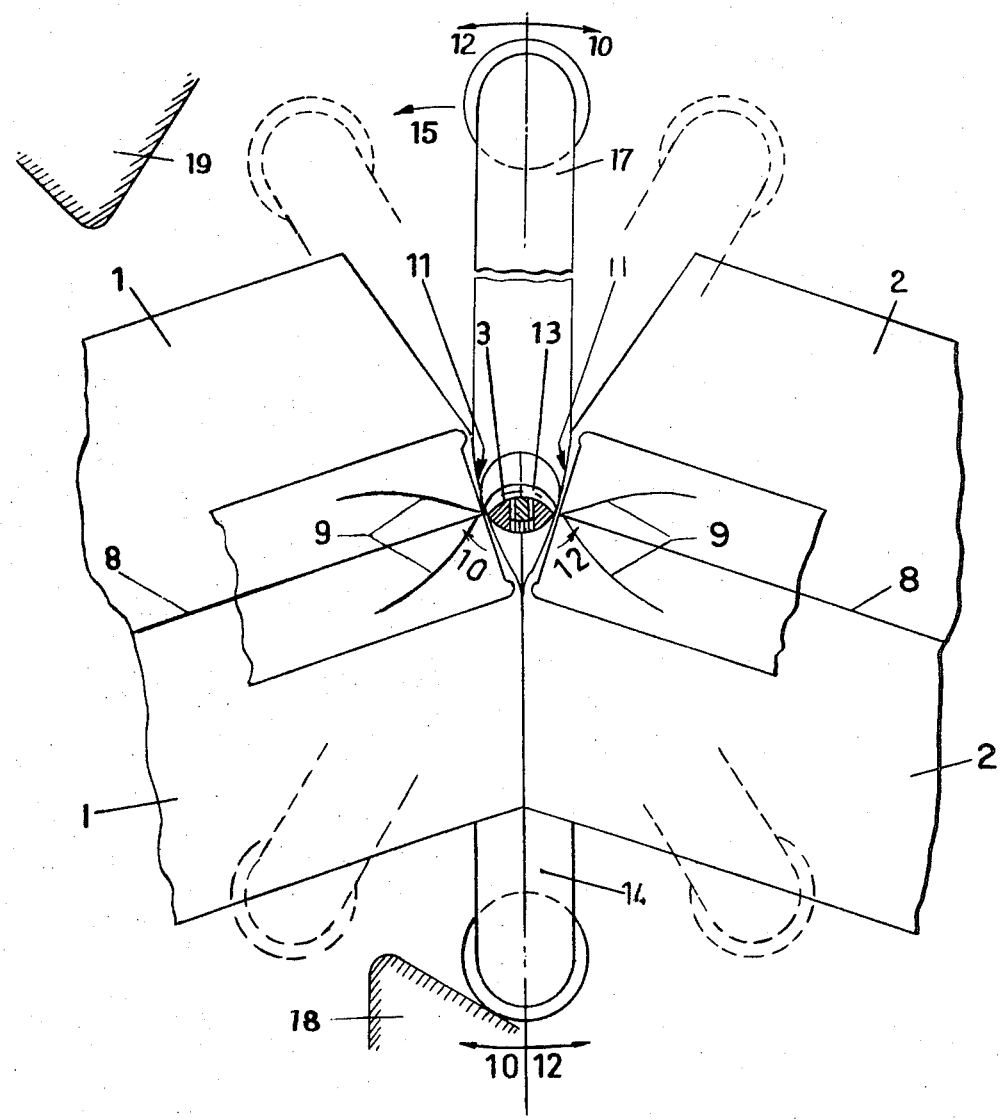
FIG. 1 is a partial, schematic elevation view, partly in cross section, showing a trimming device according to the present invention arranged between two successive molds of a rotary molding machine.

An unwanted portion of material left between the two molds, as shown at 13 in FIG. 1 is deposited on the blade 3 and cooled in contact with the latter. As the molds continue on their path, the blade-pivoting means — that is, cranks 14 — and 17 which come successively into contact with the fixed cams 18 and 19 mounted on the machine in the path of arms 14 and 17. These cams are profiled in a known manner to move first crank 14 in the direction of the arrow 10 and then crank 17 in the direction of the arrow 12. Thereafter the cranks 14 and 17 return to their original position shown by the solid lines in FIG. 1 by means, for example, of a return spring not shown. Blade 3 is rigidly connected to cranks 14 and 17 and, thus, moves first in one rotational direction and then in the opposite rotational direction through an angle in each instance sufficient for shearing through the unwanted material 13 against the respective mold bottoms 11. In performing its own corresponding movements, blade 3 first coacts with, or scrapes, the bottom 11 of the mold 1 and shears through the leading end of the unwanted material 13, and then similarly shears through the trailing end of the unwanted material 13. This unwanted material 13 is, therefore, completely separated from the parisons 9 within the molds, and can be removed in a simple manner as, for example, by gravity at a later stage in the rotation of the molds. The molds illustrated in the drawings are of the double-cavity type, and each mold can mold two hollow bodies at a time. That is, two bottles with their necks together. In this case, the ends of the molds 1 and 2 preferably have a profile such that the shearing through of the unwanted material 13 is accompanied by complete trimming of the moldings in the region of the bottoms 11 of the molds. It is to be understood, however, that the device according to the present invention may also be used with molds of the single-cavity type.

As can be appreciated from the drawings, the blade 3 should preferably be as narrow as possible, so that the distance between the molds 1 and 2, and consequently the length of the unwanted material 13, can be kept as short as possible.

Figure 2:
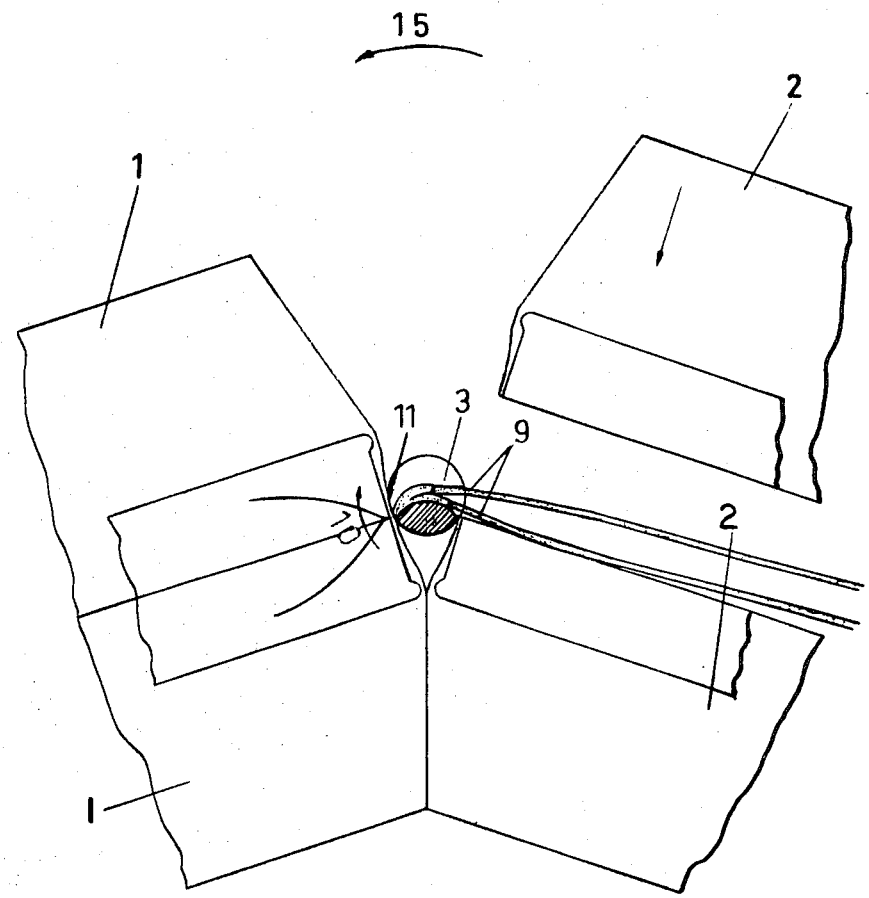
FIG. 2 is a partial, schematic elevation view similar to FIG. 1, but showing the trimming device according to the present invention performing a trimming operation while one mold is still open.
Figure 3:
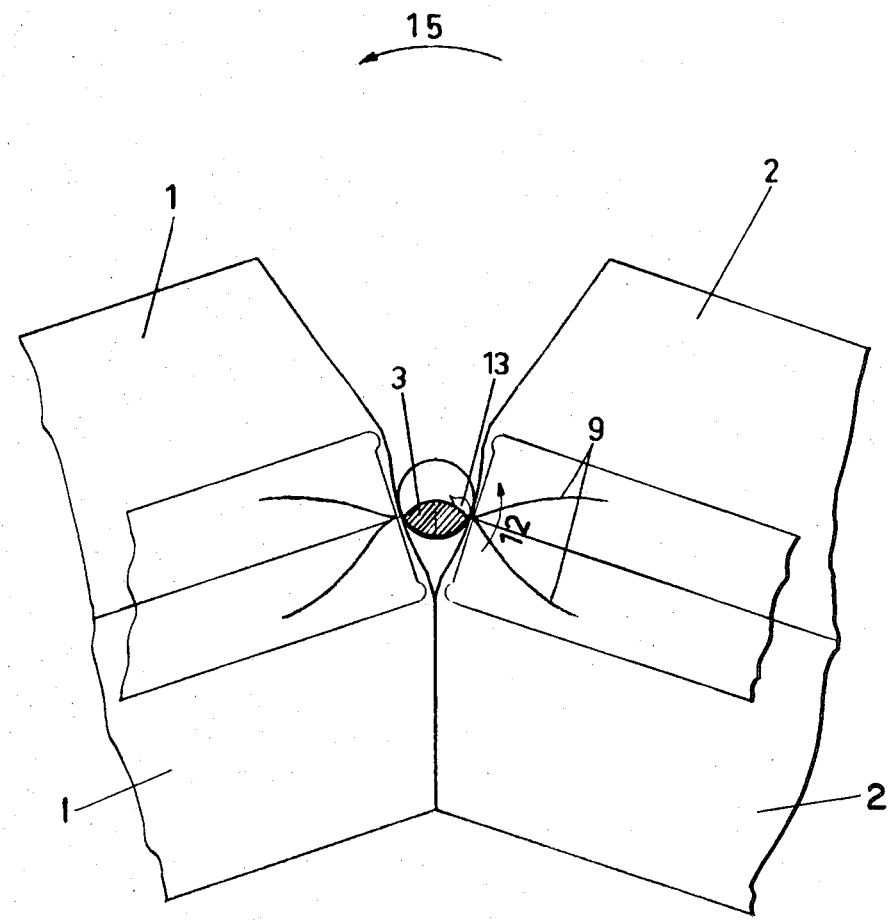
FIG. 3 is a partial, schematic elevation view similar to FIG. 2, but showing both molds closed while the trimming device according to the present invention makes a second trimming operation.

As can be seen from FIGS. 2 and 3, it is possible, if the moment when the device according to the present invention operates is judiciously chosen, to reduce the length of the unwanted material 13 to less than the distance separating the molds. More particularly, if the blade 3 is pivoted in the direction of the arrow 10 upon the closing of mold 1 — that is, the mold immediately preceding blade 3 in the direction of rotation 15 of the machine — but before closing mold 2 (FIG. 2), this pivoting movement can shear off material 13 from the parison 9 in mold 1 and produce a backward displacement of the parison 9 in mold 2 — that is, in the opposite direction to that of arrow 15 — thus reducing the length of the unwanted material 13. The latter is sheared off completely after the closing of the mold 2 by pivoting blade 3 in the direction of arrow 12 (FIG. 3).

It will be understood that the above description of the present invention is susceptible to various modifications, changes and adaptations, and the same are intended to be comprehended within the meaning and range of equivalents of the appended claims.

I claim:

1. An apparatus for trimming unwanted material from between two successive molds of a rotary machine for carrying out a process of extrusion blow-molding of hollow articles from a synthetic resin material, comprising, in combination:
   a. a double-edged blade having parallel cutting edges, each edge arranged adjacent the bottom of a respective mold and oriented parallel to the closing plane thereof when said blade is in an operative position;
   b. means for mounting said blade for pivotal movement about an axis parallel to said edges; and
   c. means for pivoting said blade first in one rotational direction and then in the opposite rotational direction through an angle in each instance sufficient for shearing through unwanted material extending from the molds by coacting with the respective mold bottom.

2. An apparatus for trimming unwanted material as defined in claim 1, wherein said blade defines a slot extending along the axis about which said blade pivots, said axis being intermediate said edges, and further including means arranged in said slot for varying the width of said blade.

3. An apparatus for trimming unwanted material as defined in claim 2, wherein said width varying means is a tapering adjustment screw.

4. An extrusion blow-molding machine for molding hollow articles from a synthetic resin material in combination with at least one apparatus for trimming unwanted material as defined in claim 3.

5. A machine as defined in claim 4, further including cam means fixedly mounted on said machine and arranged in the path of said means for pivoting said blade in said one rotational direction upon the closing of the mold immediately preceding said blade in the direction of movement of said machine.

6. A machine as defined in claim 5, wherein said cam means is arranged for pivoting said blade in said one rotational direction before the other of the molds adjacent said blade is closed.

* * * * *